United States Patent
Bach et al.

(10) Patent No.: US 8,563,134 B2
(45) Date of Patent: Oct. 22, 2013

(54) USAGE OF COPOLYMERISATES AS ADDITIVES FOR LACQUERS

(75) Inventors: Sebastijan Bach, Achsheim (DE); Gerd Hohner, Gersthofen (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 13/256,737

(22) PCT Filed: Mar. 16, 2010

(86) PCT No.: PCT/EP2010/001637
§ 371 (c)(1),
(2), (4) Date: Sep. 15, 2011

(87) PCT Pub. No.: WO2010/105797
PCT Pub. Date: Sep. 23, 2010

(65) Prior Publication Data
US 2012/0009423 A1    Jan. 12, 2012

(30) Foreign Application Priority Data

Mar. 19, 2009 (DE) .......................... 10 2009 013 902

(51) Int. Cl.
*B32B 5/16* (2006.01)
(52) U.S. Cl.
USPC ............ 428/402; 428/407; 427/212; 106/502
(58) Field of Classification Search
USPC ................... 428/402, 407; 427/212; 106/502
See application file for complete search history.

(56) References Cited

U.S. PATENT DOCUMENTS

| | | |
|---|---|---|
| 3,553,177 A | 1/1971 | Hazen et al. |
| 4,342,602 A | 8/1982 | Petz et al. |
| 4,776,889 A | 10/1988 | Diep et al. |
| 6,080,902 A | 6/2000 | Herrmann et al. |
| 2003/0154885 A1* | 8/2003 | Krendlinger et al. ......... 106/502 |
| 2005/0176866 A1 | 8/2005 | Krendlinger et al. |
| 2005/0241526 A1 | 11/2005 | Heinrichs et al. |
| 2006/0036013 A1 | 2/2006 | Heinrichs |
| 2006/0188459 A1 | 8/2006 | Heinrichs et al. |
| 2009/0036619 A1 | 2/2009 | Herrmann et al. |

FOREIGN PATENT DOCUMENTS

| | | |
|---|---|---|
| DE | 3510233 | 10/1985 |
| DE | 10224845 | 12/2003 |
| EP | 0028713 | 5/1981 |
| EP | 0890619 | 1/1999 |
| EP | 1693047 | 8/2006 |
| EP | 2020420 | * 2/2009 |
| WO | WO 03/087242 | 10/2003 |
| WO | WO 03/104289 | 12/2003 |
| WO | WO03/104289 | * 12/2003 |
| WO | WO 2007/039421 | 4/2007 |

OTHER PUBLICATIONS

PCT International Search Report for PCT/EP 2010/001637, mailed Jun. 15, 2010.
English Translation of the PCT International Preliminary Report on Patentability for PCT/EP 2010/001637, mailed Sep. 20, 2011.

* cited by examiner

*Primary Examiner* — Leszek Kiliman
(74) *Attorney, Agent, or Firm* — Anthony A. Bisulca

(57) ABSTRACT

Finely distributed copolymer waxes, which are in particular suitable as additives for lacquers, produced by a) reacting long-chained olefin hydrocarbons with chain lengths being greater than or equal to 28 C-atoms with unsaturated polycarboxylic acids or the anhydrides thereof in the presence of at least one radical initiator and b) subsequent micronization by milling or spraying, characterized in that the particles of the milled or sprayed copolymer waxes are less than 50 μm, preferably less than 40 μm, particularly preferably less than 30 μm 98 to 99 are preferred, 5% of the particles, in particular 99.5 to 100% of the particles less than 50 μm, preferably less than 40 μm, particularly preferably less than 30 μm.

35 Claims, No Drawings

USAGE OF COPOLYMERISATES AS ADDITIVES FOR LACQUERS

The invention relates to the use of copolymer waxes as additives for coating systems. The copolymer waxes are prepared by free-radically initiated reaction of long-chain olefinic hydrocarbons with unsaturated polycarboxylic acids or their anhydrides. The invention further relates to copolymer waxes thus prepared and finely comminuted by micronization.

The use of finely divided waxes in all regular coating systems is nowadays state of the art and serves the purposes, among others, of giving the coating film enhanced mechanical resistance and also of producing matting effects. Through the addition of wax, the scratch resistance and abrasion resistance are enhanced, and at the same time the film surface receives a matt appearance as a consequence of diffuse scattering of the incident light at the finely divided wax particles. Moreover, the additions of wax provide for effective dispersing of the coating pigments, and reduce their propensity to settle. Waxes improve the lubricity (the "slip") and advantageously influence the tactile properties of the coating film. With the aid of waxes, the rheological behavior of the coating system can be optimized. In powder coatings, waxes provide for an increase in throughput in the case of manufacture in an extruder, and are an effective aid to degassing.

For a relatively long time, established coatings additives have included hydrocarbon waxes, especially Fischer-Tropsch waxes and polyethylene waxes, prepared by catalytic constructive reaction from synthesis gas or by polymerization of ethylene by free-radical means or by means of Ziegler catalysis or metallocene catalysis (Adhäsion 11 (1977), page 311; EP 0 890 619). Also customary are what are called degradation waxes, formed by thermal degradation of polyethylene plastics. In all of these cases, the structures in question are apolar, straight-chain or branched-chain aliphatic structures. Additionally in use are functionalized waxes having a more or less high fraction of polar groups, prepared, for example, by oxidative degradation of polyethylene or polyethylene waxes. Other suitable polar waxes include amide waxes (EP-B-0 028 713) and also waxes containing ester groups, examples being montan wax or carnauba wax, as described in DE-A-10 224 845. The last-mentioned specification further discloses the use of wax mixtures which in addition to numerous other polar substances may also include copolymers of $C_5$-$C_{18}$-olefins with maleic anhydride.

A variety of methods are contemplated for the incorporation of the hydrocarbon waxes into the coating system. For example, the wax can be dissolved hot in a solvent to give, by subsequent cooling, finely divided liquid dispersions or materials of pastelike consistency, which are blended with the coating material. A further possibility is the milling of the waxes in the presence of solvents. According to one widespread technology, the waxes are also incorporated as solids, in the form of ultrafinely divided powders ("micronizates"), into the coating formula, by stirring. The ultrafine powders are produced either by milling, in air-jet mills, for example, or by spraying. The particle sizes of such powders are generally 100% below 50 μm, the average particle sizes (median values) $d_{50}$ being below 15 μm. A requirement for the capacity to be ground to a micronizate is not too low a hardness or brittleness on the part of the wax products.

One important aspect governing the use of micronized waxes is their affinity for the principal components of the coating material into which they are introduced. The desire is for rapid and thorough wetting of the wax powder by the surrounding liquid, to allow rapid distribution and effective dispersing. This plays an important part for all coating systems that are composed of polar components, and especially for aqueous coating systems. With respect to this requirement in particular, there is need for optimization among the waxlike coatings additives that are currently in use.

The object, therefore, was to provide readily obtainable additives for coating systems that allow good scratch resistances and abrasion resistances and also good matting effects to be achieved and that in particular are notable for improved behavior with respect to capacity for stirred incorporation and for dispersion.

Surprisingly it has been found that waxlike copolymers of long-chain alpha-olefins and unsaturated polycarboxylic acids and/or derivatives thereof are outstandingly suitable in this context.

The invention therefore provides for the use of copolymer waxes as additives for coating materials, the copolymer waxes being prepared by reacting long-chain olefinic hydrocarbons in the chain-length range greater than or equal to 28 carbon atoms with unsaturated polycarboxylic acids or their anhydrides in the presence of at least one free-radical initiator.

Further provided by the invention are copolymer waxes thus prepared and subsequently brought by milling or spraying into a finely divided state, wherein the particles produced are smaller than 50 μm, preferably smaller than 40 μm, more preferably smaller than 30 μm. The invention further encompasses finely divided copolymer waxes of this kind that have a particle size distribution median value $d_{50}$ of below 15 μm, preferably below 12 μm, more preferably below 10 μm.

Free-radically prepared reaction products of long-chain alpha-olefins and maleic anhydride are known. For example, U.S. Pat. No. 3,553,177 describes a method for copolymerizing mixtures of aliphatic olefins with maleic anhydride. The reaction is carried out with the aid of peroxides and in the presence of ketones as solvents. Reaction products of long-chain olefins with maleic anhydride are additionally known from DE-A 3 510 233.

EP-A-1 693 047 discloses copolymer waxes for cosmetic preparations, prepared from $C_{26}$-$C_{60}$ alpha-olefins and maleic anhydride.

Alpha-olefins contemplated in accordance with the invention are those having chain lengths of 28 to 60, preferably of 30-60 carbon atoms. Not only pure-chain olefins but also olefin mixtures can be used, of the kind obtained, for example, as distillation cuts or distillation residues in the known production processes. Technical alpha-olefin mixtures, more particularly those having a relatively high chain length, may comprise not only 1-alkenes but also more or less high quantities of internal and pendant olefinic double bonds (vinylene and vinylidene groups).

Representative examples of the unsaturated polycarboxylic acids and anhydrides used for reaction with the alpha-olefins are maleic acid, fumaric acid, citraconic acid, mesaconic acid, aconitic acid or itaconic acid, and the anhydrides of these polycarboxylic acids, where obtainable. Maleic anhydride is preferred. It is also possible to use mixtures of these polycarboxylic acids and anhydrides in any desired proportions. The usage ratio of the polycarboxylic acids and/or anhydrides to the alpha-olefin reactant component is between 1:20 and 1:3, preferably between 1:10 and 1:4, more preferably between 1:7 and 1:5 parts by weight. Accordingly, the use level of polycarboxylic acid and/or anhydride, relative to alpha-olefin, is between 5% and 33% by weight, preferably between 10% and 25% by weight, more preferably between 14.3% and 20% by weight.

The copolymer waxes used in accordance with the invention are prepared in a conventional way by reacting the above-mentioned components at elevated temperature with the addition of organic or inorganic free-radical-forming initiators. The reaction may be carried out in the presence or in the absence of a solvent. The latter method is preferred. Moreover, the reaction may take place both discontinuously, batchwise, in a stirred tank, for example, or else in a continuous operating reactor.

Examples of suitable organic initiators are peroxides, examples being alkyl hydroperoxides or dialkyl or diaryl peroxides, diaroyl peroxides, peresters or azo compounds. Preference is given to dialkyl peroxides, and special preference to di-tert-butyl peroxide. However, any other initiator is also suitable provided it decomposes into free radicals at the selected reaction temperature and is able to set the reaction in train. The initiators are employed in an amount of 0.1% to 10% by weight, preferably 0.5% to 5.0% by weight, based on alpha-olefin employed. The reaction temperatures, if the reaction is carried out in the absence of solvent, are above the melting temperature of the alpha-olefin, e.g., between 100 and 200° C., preferably 120 to 180° C., more preferably between 140 and 170° C.

The copolymer waxes used in accordance with the invention have the following properties:

acid numbers, determined in accordance with DIN 53402 using anhydrous ethanol and xylene, of between 40 and 150 mg KOH/g, preferably between 60 and 130 mg KOH/g, more preferably between 70 and 120 mg KOH/g;

dynamic viscosities, measured at 100° C., of between 50 and 5000 mPa*s, preferably between 100 and 3000 mPa*s, more preferably between 200 and 2000 mPa*s;

dropping points of between 60 and 95° C., preferably between 65 and 90° C., more preferably between 70 and 80° C.;

iodine numbers of between 0 and 30 g iodine/100 g, preferably between 3 and 20 g iodine/100 g, more preferably between 5 and 10 g iodine/100 g;

die penetrations of higher than 200 bar, preferably higher than 300 bar, more preferably higher than 400 bar.

The waxes of the invention can be used in all customary coating systems, examples being low/medium/high solids coating materials, solvent-based coating materials, water-thinnable or aqueous coating materials, and powder coating materials. They may be used in pure form or in a mixture with other substances suitable as coatings additives. Combinations with other apolar or polar waxes are particular possibilities. Suitability is possessed, for example, by hydrocarbon waxes, such as microcrystalline or macrocrystalline paraffins, Fischer-Tropsch paraffins or polyethylene waxes or polypropylene waxes. These waxes may also have polar modification, through oxidation, for example, or in some other way, as for instance by grafting or copolymerization with oxygen-containing monomers. Also possible are combinations with other classes of waxes, examples being amide waxes or ester waxes in natural or chemically modified form, e.g., montan waxes or carnauba waxes. Examples of suitable nonwaxlike additives are low- or high-molecular polytetrafluoroethylene, sorbitan esters, polyamides, polyolefins, polyesters, and inorganic substances such as silicon dioxide or silicates.

The incorporation of the waxes or wax mixtures of the invention into the colored coating material takes place typically via solvent dispersions, pastes or by simple stirred incorporation of micronized wax powders. The latter procedure is preferred.

Micronization may be effected by spraying of the wax melt or by milling, using air-jet mills, for example. Spraying or milling may optionally be followed by classifying.

EXAMPLES

The dynamic viscosities of the melted products were determined in accordance with DIN 53019-1 to 3 using a rotational viscometer, while the dropping points were determined in accordance with ASTM D 3954. The acid number was determined in accordance with DIN 53402, with the difference that the toluene and ethanol solvents used were employed in anhydrous form, in order to prevent hydrolytic cleavage of the anhydride groups. The iodine number was determined in accordance with DIN EN 14111. The die penetration, as a measure of the hardness, was measured by the DGF M-III 9e method (cf. Fiebig, Braun, Fett/Lipid 98, 1996, No. 2, 86). The particle size analysis in the case of micronizates was carried out by laser diffraction using a Mastersizer 2000 instrument (Malvern) and using the Scirocco 2000 dispersing unit.

Preparation of the Copolymer Waxes 2500 g of alpha-olefin $C_{30}$+ (olefin mixture from Chevron-Phillips) were melted under nitrogen blanketing in a glass apparatus equipped with stirrer, internal thermometer, and distillation bridge. Then the amount of maleic anhydride indicated in Table 1, distributed over six equal portions, was metered in at intervals of 30 minutes in each case. Within the same period of time, 50 g of di-tert-butyl peroxide were added continuously from a dropping funnel. Reaction was then left to continue for 1 hour. At this point, volatile fractions were distilled off under reduced pressure (approximately 30 mbar). After about 30 minutes, nitrogen was admitted to let down the system to atmospheric pressure. The data for the resulting copolymer waxes are listed in Table 1.

TABLE 1

Copolymer waxes from alpha-olefin $C_{30}$+ and maleic anhydride

| Example | Amount of maleic anhydride used[1] % by weight | Acid number mg KOH/g | Viscosity/ 100° C. mPa * s | Dropping point ° C. | Die penetration bar | Iodine number g iodine/ 100 g |
|---|---|---|---|---|---|---|
| 1 | 15.0 | 80 | 329 | 74 | 510 | 8.2 |
| 2 | 18.0 | 93 | 2767 | 73 | 580 | 6.0 |

[1]based on alpha-olefin employed

Performance Tests

The waxes micronized on a 100 AFG air-jet mill (Hosokawa Micron) (100% smaller than 25-30 μm, $d_{50}$ values between 7.5 and 8.5 μm) were metered slowly and continuously into the coating formulas, with stirring, and were then dispersed with intensive stirring using a dissolver disk for 20 minutes.

The coefficient of sliding friction of the coating films was determined using a 225-1 Friction Peel Tester (manufacturer: Thwing-Albert Instruments)

The parameters of transmittance, haze, and clarity were determined with the aid of a haze-gard plus instrument (manufacturer: Sheen Instruments).

The Bosch scratch resistance was measured using a model 318 hardness testing rod (manufacturer: Erichsen).

For the comparative examples, the following commercial products were used: Crayvallac WN 1135: polar-modified micronized polypropylene wax, manufacturer: Cray Valley Ceridust 9615 A: micronized wax mixture containing amide wax, Clariant International Ltd.

Ceridust 5551: micronized ester wax, Clariant international Ltd.

Ceridust 3920 F: micronized, PTFE-containing polyethylene wax, Clariant International Ltd.

Ceridust 3731: micronized, acid-functional polyethylene wax, Clariant International Ltd.

Testing in a Nitrocellulose Varnish Formula:

|  | Parts by weight |
|---|---|
| Walsroder Nitrocellulose E 560 30% in isopropanol (Dow Wolff Cellulosics) | 14.3 |
| Alkyldal F 26 X (60% in xylene) (alkyd resin, Bayer) | 16.7 |
| Palatinol IC (diisobutyl phthalate) (BASF) | 1.5 |
| Unimoll BB (benzyl butyl phthalate) (Lanxess) | 1.5 |
| Butyl acetate | 11.4 |
| Ethyl acetate | 18.5 |
| Methyl isobutyl ketone | 5.0 |
| Ethylglycol | 3.0 |
| Toluene | 12.0 |
| Xylene | 12.6 |
| Baysilone OL 17 (1% in xylene) (Bayer) | 3.5 |

Results:

| Example No. | Wax additive | Amount added % by wt. | Gloss (angle 60°) | Trans- mittance % | Haze % | Clarity % | Coefficient of sliding friction | Bosch scratch resistance N |
|---|---|---|---|---|---|---|---|---|
| Ref. | no wax | — | 152 | 91 | 1 | 100 | 0.74 | 0.1 |
| 1 | from Ex. 1 | 2 | 31 | 90 | 45 | 57 | 0.50 | 0.8 |
| 2 | from Ex. 1 | 4 | 14 | 90 | 72 | 29 | 0.46 | 0.4 |
| 3 | from Ex. 2 | 2 | 29 | 90 | 43 | 58 | 0.51 | 0.9 |
| 4 | from Ex. 2 | 4 | 12 | 91 | 70 | 29 | 0.44 | 0.5 |
| C 1 | Crayvallac WN 1135 | 2 | 29 | 90 | 44 | 58 | 0.58 | 0.7 |
| C 2 | Crayvallac WN 1135 | 4 | 13 | 90 | 70 | 28 | 0.54 | 0.2 |
| C 3 | Ceridust 9615 A | 2 | 29 | 90 | 44 | 59 | 0.54 | 0.5 |
| C 4 | Ceridust 9615 A | 4 | 13 | 89 | 70 | 29 | 0.49 | 0.3 |

The waxes of the invention were dispersed into the coating material significantly more rapidly than the comparative products.

Testing in a 2-Component FUR Varnish Formula:

|  | Parts by weight |
|---|---|
| Component 1 |  |
| Desmophen 1300/75% in xylene (Bayer) | 32.0 |
| Walsroder Nitrocellulose E 510 in 20% ESO (Dow Wolff Cellulosics) | 1.5 |
| Acronal 4 L, 10% in ethyl acetate (BASF) | 0.2 |
| Baysilone OL 17 10% in xylene (Bayer) | 0.2 |
| Ethyl acetate | 10.4 |
| Butyl acetate | 11.0 |
| Methoxypropyl acetate | 10.8 |
| Xylene | 8.9 |
| Total | 75.0 |
| Component 2 |  |
| Desmodur IL (Bayer) | 14.2 |
| Desmodur L 75 (Bayer) | 9.4 |
| Xylene | 1.4 |
| Total | 25.0 |

Results:

| Example No. | Wax additive | Amount added % by wt. | Gloss (angle 60°) | Trans- mittance % | Haze % | Clarity % | Coefficient of sliding friction | Bosch scratch resistance N |
|---|---|---|---|---|---|---|---|---|
| Ref. | no wax | — | 159 | 91 | 0 | 100 | 0.68 | 0.1 |
| 5 | from Ex. 1 | 2 | 61 | 90 | 18 | 68 | 0.37 | 0.4 |
| 6 | from Ex. 1 | 4 | 28 | 90 | 39 | 51 | 0.35 | 0.8 |
| C 5 | Crayvallac WN 1135 | 2 | 72 | 90 | 13 | 72 | 0.38 | 0.2 |
| C 6 | Crayvallac WN 1135 | 4 | 36 | 90 | 30 | 48 | 0.36 | 0.7 |
| C 7 | Ceridust 9615 A | 2 | 73 | 90 | 12 | 73 | 0.41 | 0.2 |
| C 8 | Ceridust 9615 A | 4 | 39 | 90 | 26 | 51 | 0.38 | 0.5 |
| C 9 | Ceridust 5551 | 2 | 62 | 90 | 18 | 69 | 0.48 | 0.6 |

-continued

| Example No. | Wax additive | Amount added % by wt. | Gloss (angle 60°) | Transmittance % | Haze % | Clarity % | Coefficient of sliding friction | Bosch scratch resistance N |
|---|---|---|---|---|---|---|---|---|
| C 10 | Ceridust 5551 | 4 | 26 | 89 | 40 | 42 | 0.49 | 0.6 |
| C 11 | Ceridust 3920 F | 2 | 76 | 90 | 12 | 74 | 0.40 | 0.3 |
| C 12 | Ceridust 3920 F | 4 | 42 | 90 | 26 | 54 | 0.38 | 0.6 |

The wax of the invention was dispersed into the coating material significantly more rapidly than the comparative products.

Testing in an Aqueous Acrylic Varnish
Formula:

|  | Parts by weight |
|---|---|
| Viacryl VSC 6295w/45WA (Solutia) | 88.5 |
| Butylglycol | 3.8 |
| Ethyldiglycol | 2.0 |
| Demineralized water | 4.0 |
| Coatex BR 100 (Coatex) | 0.4 |
| Surfynol DF 110 (Biesterfeld Spezialchemie) | 0.5 |
| BYK 348 (Byk-Chemie) | 0.2 |
| BYK 347 (Byk-Chemie) | 0.2 |
| BYK 380 N (Byk-Chemie) | 0.4 |

Results:

| Example No. | Wax additive | Amount added % by wt. | Gloss (angle 60°) | Transmittance | Haze % | Clarity % | Coefficient of sliding friction | Bosch scratch resistance N |
|---|---|---|---|---|---|---|---|---|
| Ref. | no wax | — | 153 | 91 | 0 | 100 | 0.56 | 0.1 |
| 7 | from Ex. 1 | 2 | 60 | 90 | 21 | 66 | 0.37 | 0.6 |
| 8 | from Ex. 1 | 4 | 31 | 90 | 38 | 45 | 0.37 | 0.3 |
| C 13 | Crayvallac WN 1135 | 2 | 65 | 90 | 22 | 72 | 0.36 | 0.6 |
| C 14 | Crayvallac WN 1135 | 4 | 35 | 90 | 38 | 52 | 0.36 | 0.5 |
| C 15 | Ceridust 9615 A | 2 | 70 | 90 | 22 | 75 | 0.35 | 0.5 |
| C 16 | Ceridust 9615 A | 4 | 37 | 90 | 40 | 55 | 0.34 | 0.3 |
| C 17 | Ceridust 3731 | 2 | 53 | 91 | 23 | 74 | 0.38 | 0.4 |
| C 18 | Ceridust 3731 | 4 | 27 | 90 | 42 | 55 | 0.37 | 0.8 |

The wax of the invention was dispersed into the coating material significantly more rapidly than the comparative products.

Testing in an Aqueous UV Varnish
Formula:

|  | Parts by weight |
|---|---|
| Bayhydrol UV VP LS 2282 (Bayer) | 60.0 |
| Dehydran 1293 (Cognis) | 0.80 |
| Irgacure 500 (Ciba) | 0.50 |
| BYK 348 (Byk-Chemie) | 0.50 |
| Water | 36.8 |
| SchwegoPUR 8050 (Schwegmann) | 0.90 |

Results:

| Example No. | Wax additive | Amount added % by wt. | Gloss (angle 60°) | Transmittance % | Haze % | Clarity % | Coefficient of sliding friction | Bosch scratch resistance N |
|---|---|---|---|---|---|---|---|---|
| Ref. | no wax | — | 152 | 91 | 1 | 99 | 0.83 | 0.1 |
| 9 | from Ex. 1 | 2 | 52 | 90 | 20 | 57 | 0.49 | 0.7 |
| 10 | from Ex. 1 | 4 | 22 | 90 | 46 | 32 | 0.4 | 1.1 |
| C 19 | Crayvallac WN 1135 | 2 | 58 | 90 | 22 | 65 | 0.48 | 0.5 |

-continued

| Example No. | Wax additive | Amount added % by wt. | Gloss (angle 60°) | Trans-mittance % | Haze % | Clarity % | Coefficient of sliding friction | Bosch scratch resistance N |
|---|---|---|---|---|---|---|---|---|
| C 20 | Crayvaliac WN 1135 | 4 | 26 | 90 | 43 | 38 | 0.43 | 1.2 |
| C 21 | Ceridust 9615 A | 2 | 68 | 90 | 19 | 68 | 0.52 | 0.6 |
| C 22 | Ceridust 9615 A | 4 | 31 | 90 | 39 | 43 | 0.42 | 0.9 |

The wax of the invention was dispersed into the coating material significantly more rapidly than the comparative products.

What is claimed is:

1. A method for the manufacture of a finely divided copolymer wax
   a) reacting long-chain olefinic hydrocarbons in the chain-length range greater than or equal to 28 carbon atoms with unsaturated polycarboxylic acids or their anhydrides in the presence of at least one free-radical initiator; and
   b) micronizing, by milling or spraying,
   wherein the particles of the milled or sprayed copolymer wax are smaller than 50 μm.

2. The method as claimed in claim 1, where 98% to 99.5% of the particles are smaller than 50 μm.

3. The method as claimed in claim 1, having a particle size distribution median value $d_{50}$ of below 15 μm.

4. An additive for a coating material, the additive comprising a copolymer wax wherein the copolymer wax is prepared by reacting long-chain olefinic hydrocarbons in the chain-length range greater than or equal to 28 carbon atoms with unsaturated polycarboxylic acids or their anhydrides in the presence of at least one free-radical initiator.

5. The additive for a coating material as claimed in claim 4, wherein said wax has an acid number of between 40 and 150 mg KOH/g, determined in accordance with DIN 53402 using anhydrous ethanol and toluene.

6. The additive for a coating material as claimed in claim 4, wherein said wax has a dynamic viscosity, measured at 100° C., of between 50 and 5000 mPa*s.

7. The additive for a coating material as claimed in claim 4, wherein said wax has a dropping point of between 60 and 95° C.

8. The additive or a coating material as claimed in at claim 4, wherein said wax has an iodine number of between 0 and 30 g iodine/100 g.

9. The additive for a coating material as claimed in claim 4, wherein said wax has a die penetration of higher than 200 bar.

10. The additive for a coating material as claimed in claim 4, the copolymer wax obtained by reacting long-chain olefinic hydrocarbons in the chain-length range greater than or equal to 28 carbon atoms with maleic anhydride.

11. The additive for a coating material as claimed in claim 4, the copolymer wax obtained by reacting long-chain olefinic hydrocarbons in the chain-length range greater than or equal to 28 carbon atoms with maleic anhydride in a weight ratio of 1:20 to 1:3.

12. The additive for a coating material as claimed in claim 4, wherein said wax is used in the form of a dispersion, paste or micronizate.

13. The additive for a coating material as claimed in claim 12, wherein the particles of the micronizate being smaller than 50 μm, and the particle size distribution median value $d_{50}$ is below 15 μm.

14. The additive for a coating material as claimed in claim 4, wherein the copolymer wax or mixture thereof is incorporated via solvent dispersions, pastes or by stirred incorporation into the colored coating material.

15. The method as claimed in claim 1, wherein the particles of the milled or sprayed copolymer wax are smaller than 40 μm.

16. The method as claimed in claim 1, wherein the particles of the milled or sprayed copolymer wax are smaller than 30 μm.

17. The method as claimed in claim 1, wherein 99.5% to 100% of the particles, are smaller than 50 μm.

18. The method as claimed in claim 1, wherein 98% to 99.5% of the particles are smaller than 40 μm.

19. The method as claimed in claim 1, wherein 99.5% to 100% of the particles are smaller than 40 μm.

20. The method as claimed in claim 1, wherein 98% to 99.5% of the particles are smaller than 30 μm.

21. The method as claimed in claim 1, wherein 99.5% to 100% of the particles are smaller than 30 μm.

22. The method as claimed in claim 1, having a particle size distribution median value $d_{50}$ of below 12 μm.

23. The method as claimed in claim 1, having a particle size distribution median value $d_{50}$ of below 10 μm.

24. The additive for a coating material as claimed in claim 4, wherein said wax has an acid number of between 60 and 130 mg KOH/g, determined in accordance with DIN 53402 using anhydrous ethanol and toluene.

25. The additive for a coating material as claimed in claim 4, wherein said wax has an acid number of between 70 and 120 mg KOH/g determined in accordance with DIN 53402 using anhydrous ethanol and toluene.

26. The additive for a coating material as claimed in 4, wherein said wax has a dynamic viscosity, measured at 100° C., of between 100 and 3000 mPa*s, more preferably between 200 and 2000 mPa*s.

27. The additive for a coating material as claimed in 4, wherein said wax has a dynamic viscosity, measured at 100° C., of between 200 and 2000 mPa*s.

28. The additive for a coating material as claimed in claim 1, wherein said wax has a dropping point of between 65 and 90° C.

29. The additive for a coating material as claimed in claim 4, wherein said wax has a dropping point of between 70 and 80° C.

30. The additive for a coating material as claimed in at claim 4, wherein said wax has an iodine number of between 3 and 20 g iodine/100 g.

31. The additive for a coating material as claimed in at claim 4, wherein said wax has an iodine number of between 0 and 30 g iodine/100 g between 5 and 10 g iodine/100 g.

32. The additive for a coating material as claimed in claim 4, wherein said wax has a die penetration of higher than 300 bar.

33. The additive for a coating material as claimed in claim 4, wherein said wax has a die penetration of higher than 400 bar.

34. The additive for a coating material as claimed in claim 12, wherein the particles of the micronizate are smaller than 40 μm, and the particle size distribution median value $d_{50}$ is below 12 μm.

35. The additive for a coating material as claimed in claim 12, wherein the particles of the micronizate being smaller than 30 μm, and the particle size distribution median value $d_{50}$ is 10 μm.

* * * * *